CARL JOHN KROEPEL
INVENTOR

May 23, 1967  C. J. KROEPEL  3,321,059
PASSENGER CONVEYOR BALUSTRADE
Filed Sept. 10, 1965  3 Sheets-Sheet 2

CARL JOHN KROEPEL
INVENTOR
BY W L Hunter ATTORNEY

May 23, 1967

C. J. KROEPEL 3,321,059

PASSENGER CONVEYOR BALUSTRADE

Filed Sept. 10, 1965

CARL JOHN KROEPEL
INVENTOR

BY ATTORNEY

United States Patent Office 3,321,059
Patented May 23, 1967

3,321,059
PASSENGER CONVEYOR BALUSTRADE
Carl John Kroepel, Manhasset, N.Y., assignor to Otis Elevator Company, New York, N.Y., a corporation of New Jersey
Filed Sept. 10, 1965, Ser. No. 486,276
22 Claims. (Cl. 198—16)

This invention relates generally to passenger conveyors such as moving stairways or sidewalks and particularly to a novel balustrade and handrail supporting structure therefor.

Passenger conveyors typically comprise a moving belt or a series of platforms or steps operating between two landings which may be at the same or different elevations. At each side of the belt or platforms is an upstanding balustrade on the top of each of which is a moving handrail. Each balustrade terminates in a curved newel section around which the handrail passes. The balustrade may be either opaque or transparent. If transparent, it may be either of two general types of construction. In the first type, a series of posts extend upwardly from a base adjacent to the platform or steps and carry an elongated handrail supporting bar which in turn carries a handrail guiding mechanism and the handrail itself. The transparent portions are supported jointly by the base, the posts, and the bar. In the second type of construction the base supports panels of structural glass which in turn support the handrail supporting mechanism directly. The upstanding posts may be omitted entirely but at present it is preferred to provide small posts between adjacent side panels both for esthetic reasons and to support the handrail temporarily during construction.

Whether the panels are of structural or of ordinary glass, it has been known to form the handrail support bar into an approximately semi-circular shape to define newels at each end of the conveyor. Additionally, it has been known to flare or widen the support bar gradually starting near the middle portion of the newel and continuing the flare outwardly on each side around the lower portion of the newel. At the end of the newels the flared portions blend into or become the interior and exterior ledges which ledges extend throughout the main run of the conveyor to the opposite newel.

With this kind of construction, the handrail support bar becomes, in effect, an interior and an exterior handrail molding both at the top of the side panels under the main run of the handrail and also where flared around the newel sections. Although the two moldings are on opposite sides of the handrail, they have both been a part of the same piece of material, usually metal. It is usually desirable to make the interior molding, including the flared portions, as well as the interior ledge, of a material which resists abrasion well such as stainless steel. On the other hand, it is frequently desirable for the sake of appearance to make the exterior molding, including the flared portion, and the exterior ledge, of a different material or at least to provide a different surface finish. In the past the wide exterior ledge has been made at least in part of a different material in the region between newels adjacent to the bottom of the transparent panels but it has hitherto been difficult and expensive, if not impossible, to make the interior and exterior moldings along the main run of the handrail and the interior and exterior flares at the newels, of different materials.

It is a general object of the present invention to provide an improved balustrade and handrail supporting mechanism.

It is another object of the invention to provide a balustrade and handrail support which readily permit portions of the handrail supporting structure on opposite sides of transparent side panels to be made of different materials.

Another object is to provide a balustrade and handrail supporting mechanism which allows the interior and exterior moldings and ledges to be made of different materials.

Another object is to provide a balustrade and handrail supporting arrangement in which the exterior handrail support molding is a separate part which can be easily attached to the remainder of the assembly.

Briefly stated, the invention comprises a balustrade using structural gas side panels which actually support the weight of the moving handrail. The large structural supporting posts formerly required can be replaced by small decorative posts. The handrail supporting bar, formerly required to bear the weight of the handrail between structural posts, is made in two pieces one of which overlaps the structural glass panel on the inside to form an interior molding and the other of which overlaps the structural glass panel on the outside to form the exterior molding. These two pieces, which may be made of different materials, are fastened together, gripping the glass between them, and jointly support the handrail guiding mechanism. They are formed into approximately semi-circular shapes to define newels and are flared outwardly around the newels and blend into the interior and exterior ledges.

For a clearer understanding of the invention reference may be made to the following detailed description and the accompanying drawing in which.

Figures 1, 3, 5:
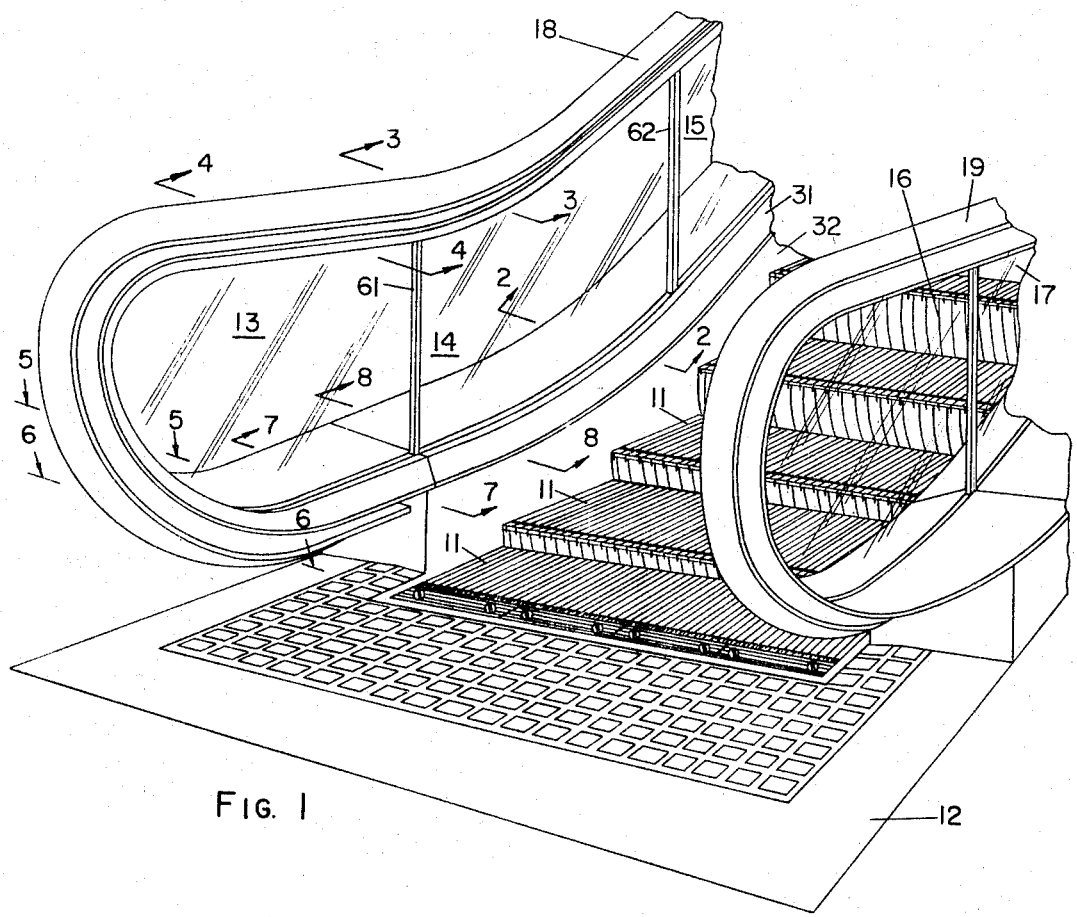
FIGURE 1 is a pictorial view of a passenger conveyor incorporating the present invention.
FIGURE 3 is a cross sectional view taken on the line 3—3 of FIGURE 1.
FIGURE 5 is a cross sectional view taken on the line 5—5 of FIGURE 1.

Referring first to FIGURE 1, the invention is illustrated as applied to a balustrade for a moving stairway, although it is obvious that the invention could be used with other kinds of passenger conveyors such as moving platforms and moving sidewalks. In FIGURE 1 there are shown a plurality of steps 11 extending from a first landing area 12 to another landing area (not shown). To each side of the steps are a plurality of side panels such as the panels 13, 14, 15, 16 and 17 which are made of structural glass and which support the moving handrails 18 and 19.

Figure 2:
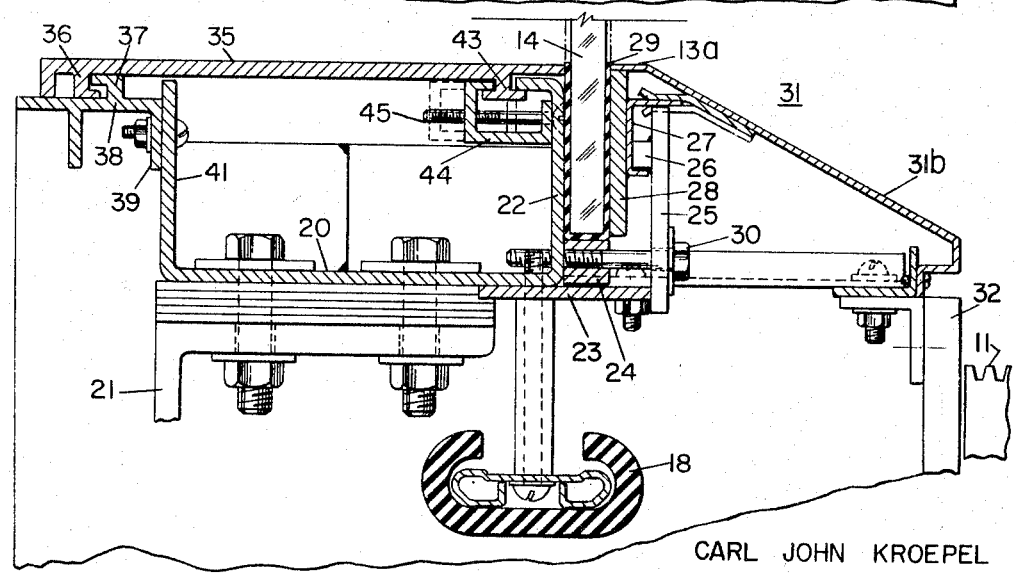
FIGURE 2 is a cross sectional view taken on the line 2—2 of FIGURE 1.

As best shown in FIGURE 2, a structural member 20, fastened to the supporting truss 21, is formed with a generally vertical flange portion 22. Another structural member 23 supports an elongated bar 24 adjacent to the bottom of the flange portion 22. An upstanding bracket 25 has a stud 26 welded thereto which bears against a bracket 27 which in turn engages an elongated strap 28. The strap 28 is spaced from the flange portion 22 and defines therewith a recess into which the structural glass panel 14 fits, the bottom thereof being supported by the bar 24. A channel shaped insert or nosing 29 made of a resilient material such as rubber covers the bottom edge and a portion of the exterior and interior faces of the panel 14 and prevents direct contact between the glass panel 14 and the metal parts 22, 24 and 28. A series of bolts 30 pass through apertures in the bracket 25 and the bar 24 and are threaded into the flange portion 22, thereby clamping the panel 14 in place.

To the right of the side panel 14, as viewed in FIGURES 1 and 2 and near the bottom thereof is an "interior" ledge 31, so called because it is adjacent to the "interior" face of the side panel 14, that is, the face toward the center of the conveyor. The interior ledge 31 includes a narrow top portion 31a adjacent to the side panel 14 and a downwardly sloping portion 31b which terminates near the top of a skirt panel 32. The latter is a substantially vertical member extending downwardly opposite the steps 11 to a point beneath the top thereof. The interior ledge 31 and the skirt panel 32 are fastened to portions of the frame and extend the entire distance between landings.

To the left of the side panel 14 is an exterior ledge 35 which is formed with a downwardly depending generally L-shaped lug 36 which cooperates with an upwardly extending lug 37 of inverted L-shape which in turn is part of a bracket 38. Bracket 38 has a downwardly turned flange portion 39 which is bolted to a vertical flange 41 which is a part of the structural member 20. The exterior ledge 35 is also formed with a downwardly depending lug 43 with a cross section having the shape of an inverted T which cooperates with a bracket 44. A series of bolts 45 pass through apertures in the flange portion 22 and are threaded into the bracket 44. Prior to the insertion of the glass panel 14 and the joining of the members 22 and 25 by the bolts 30, the bolts 45 are tightened thereby drawing the exterior ledge 35 to the right, as viewed in FIGURE 2, until the lug 36 engages the lug 37. Then the panel 14 may be installed and the ledge 31 may be drawn up by tightening the bolts 30.

The side panels 14, 15 and others like them are supported at the bottom as just explained and extend side by side from one newel to the other. The side panel 13 fits in the newel section as will be more fully explained. A plurality of thin metal posts such as the posts 61 and 62 of square cross section approximately the width and the thickness of the glass panels, are placed between adjacent panels. It would be possible to omit these posts but at present it is preferred that they be included both to improve the appearance at the edges of the side panels and to support the handrails temporarily during construction of the balustrade. For the latter purpose each post is provided with an angle bracket 63 (FIGURE 3).

The handrail 18 and its supporting and guiding mechanism in the region between newels is shown in FIGURE 3 wherein a channel shaped strip 65 of resilient material such as rubber is positioned along the top edge of the panel 14. On top of the strip 65 is an elongated metal plate 66 formed with a down turned flange 67 on one edge which engages the strip 65 along the interior edge, that is, the edge of the panel which is nearer to the center line of the conveyor. The plate 66 and its flange 67 constitute one of the handrail support moldings which extend along the entire length of the conveyor from one newel to the other. It is preferably made of a strong smooth metal which resists abrasion and tarnishing such as stainless steel. The plate 66 extends to the left, as viewed in FIGURE 3, beyond the edge of the side panel 14. An elongated member 68 of channel shaped cross section, also preferably of stainless steel, is welded or otherwise suitably fastened with its base on top of the plate 66 and extending to the left beyond the flangeless edge of the plate 66 with the edges of the channel extending upwardly as shown. The other or exterior handrail support molding is an elongated member 69 of roughly channel shape, although not symmetrical. It is positioned with its base down and its legs extending upwardly. One leg, which is narrower and shorter than the other, is positioned so that its outside vertical edge is in juxtaposition with the flange portion 67 and engages the strip 65 on the exterior edge of the panel 14. The upper edge of this leg engages the underside of the plate 66. The other leg of the molding 69 is longer and thicker and its upper end engages the bottom of the channel member 68 in the region beyond the edge of the plate 66, with a portion extending to the left beyond the leg of the channel member 68. A bolt 71 extends through an aperture in the base of the molding 69 and through an aperture in the plate 66 and the channel member 68 and is threaded into another structural channel member 72. With this arrangement it is apparent that the interior and exterior moldings 66 and 69 respectively are separate pieces and therefore can be made of different materials. The two moldings are fastened to the remainder of the assembly quite easily by the bolts 71, and when so assembled, they clasp the panel 14 between them.

The handrail 18 is supported by a guide or track 75 which it engages on each side. The track is fastened by a screw 76 to another structural channel member 77 which in turn is welded or otherwise suitably fastened to the channel member 72.

Also shown in FIGURE 3 is a typical post, such as the post 62, to which is fastened the triangular brace 63 the flat top portion of which engages the underside of the molding 69 to support it temporarily during construction.

The handrail support moldings 66 and 69 as above described extend along the main run of the conveyor, that is, the portion between newels. At each end, the moldings 67 and 69 are curved along an approximately semicircular arc, as shown in FIGURE 1, to define the newels. Additionally, the moldings are each flared outwardly, starting at a point approximately in the middle of the semi-circular arc where the handrail is approximately vertical. The transition from the configuration shown in FIGURE 3 can best be understood by considering several sections taken at various locations around the newel.

Figure 4:
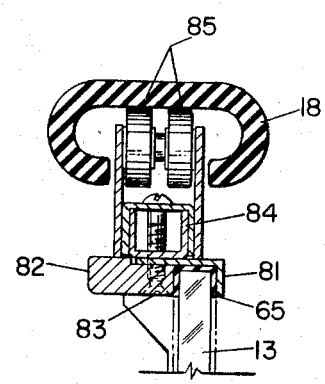
FIGURE 4 is a cross sectional view taken on the line 4—4 of FIGURE 1.

Referring to FIGURE 4, the interior molding 81 is substantially the same as the molding 67 of FIGURE 3. The exterior molding 82 is less of a channel shape than the molding 69 of FIGURE 3, and almost rectangular in cross section. A screw 83 fastens the moldings to a structural channel member 84. The handrail 18 is supported and guided by rollers 85, instead of the track 75, around the newels.

It is to be noted that the external, visible outlines of the moldings 81 and 82 are identical to the outlines of the moldings 67 and 69 respectively, so that these parts may be butted together in the vicinity of the post 61 without creating any visible discontinuity.

The configuration of FIGURE 4 continues along the top of the newel, and along the upper part of the circular arc. At a point approximately half way along the arc, the flaring of each molding becomes evident. The interior molding 81 of FIGURE 4 flares outwardly and gradually attains the cross section of the interior molding 87 of FIGURE 5. The molding becomes hollow and the hollow portion is filled by structural members 88 and 89. The exterior molding 82 of FIGURE 4 is simply extended in width to form the molding 90.

Figure 6:
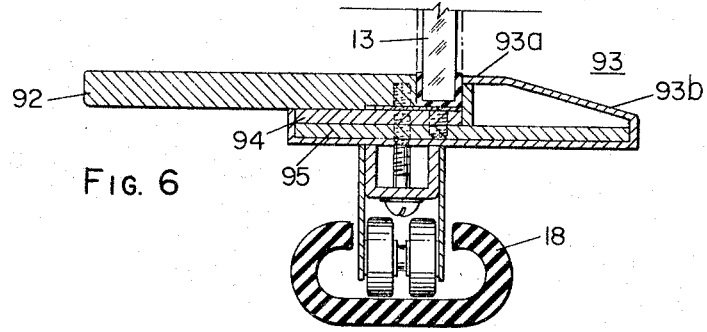
FIGURE 6 is a cross sectional view taken on the line 6—6 of FIGURE 1.

Progressing around the arc of the newel to the position of FIGURE 6 the exterior molding is simply increased in width to that shown at 92 in FIGURE 6. However, the interior molding 93 now has a different shape, including a flat portion 93a adjacent to the panel 13 and a sloping portion 93b. The molding 93 is hollow, and surrounds structural members 94 and 95 which, however, do not fill the entire interior. The important thing for present purposes is that the size and shape of the molding changes gradually from that shown at 87 in FIGURE 5 to that shown at 93 in FIGURE 6.

Figure 7:
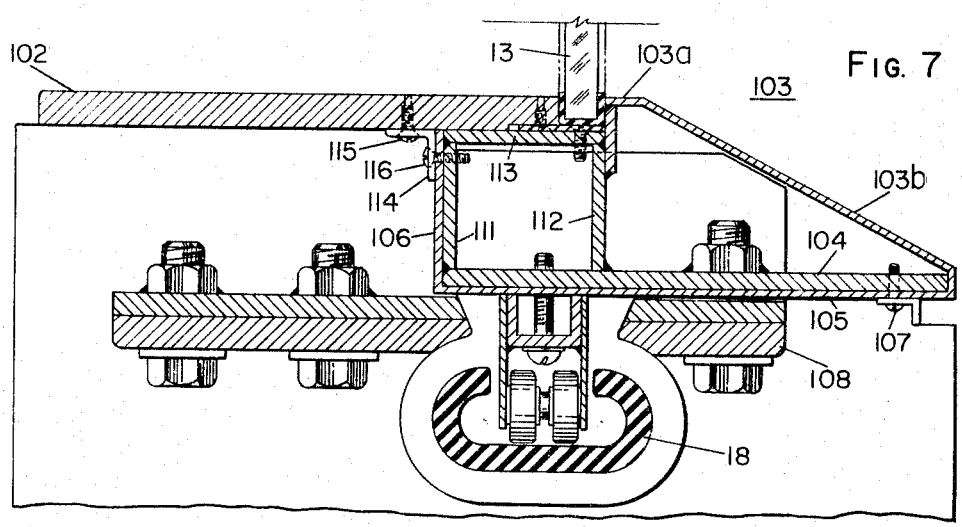
FIGURE 7 is a cross sectional view taken on the line 7—7 of FIGURE 1.

Continuing around the newel from the position of FIGURE 6 to that of FIGURE 7, the exterior molding attains its final width as shown at 102. The interior molding 103 has a flat portion 103a adjacent to the panel 13 and a sloping portion 103b similar to the portions 93a and 93b of FIGURE 6. However, the sloping portion 103b is longer and steeper than the portion 93b. Near the bottom of the sloping portion the molding 103 is bent around and under a horizontal structural plate 104. The molding 103 includes a portion 105 under the plate 104 and an upstanding portion 106. The portion 105 is fastened to the plate 104 by a screw 107 and the plate 104 is bolted to a portion 108 of the supporting truss. A pair of upstanding structural members 111 and 112 are welded to the plate 104 and a horizontal structural member 113 is welded to the members 111 and 112. A bracket 114 is fastened by a screw 115 to the exterior molding 102 and is fastened by a screw 116 to the portion 106 of the molding 103 and to the structural member 111.

Figure 8:
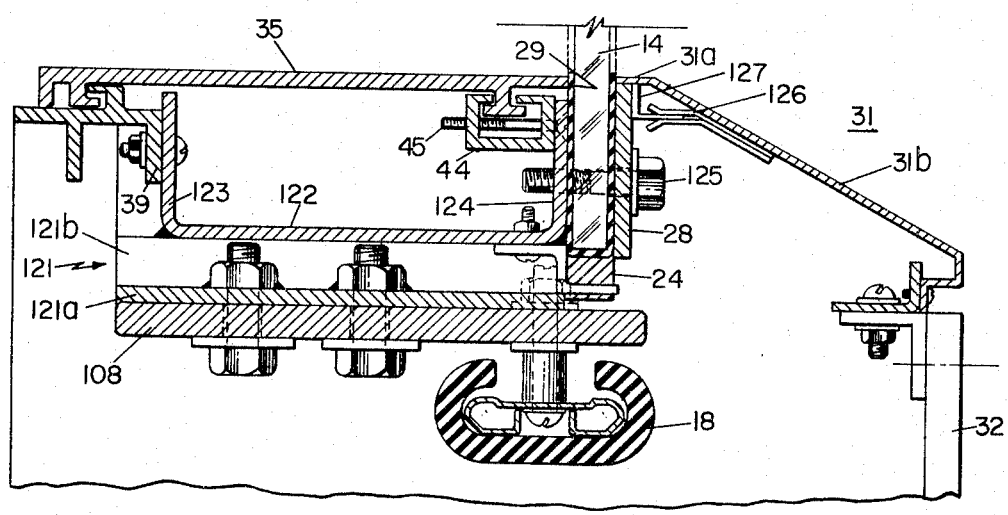
FIGURE 8 is a cross sectional view taken on the line 8—8 of FIGURE 1.

The view of FIGURE 8 is similar to that of FIGURE 2 and many parts are identical and have been designated by the same reference characters. However, there are some differences. A structural angle member 121 includes a generally horizontal portion 121a bolted to the portion 108 of the truss (the same portion as is shown in FIGURE 7) and a generally vertical portion 121b welded to a structural member 122. The latter includes generally vertical flange portions 123 and 124 which support the exterior ledge 35 in the same way as do the flange portions 22 and 41 of FIGURE 2.

In the region of the section shown in FIGURE 8, the side panel 14 is clamped between the strap 28 and the flange portion 124 by a bolt 125 which passes through suitable apertures in the strap 28, the panel 14 and the portion 124.

A spring clip 126 is fastened to the under side of the interior ledge 31 and engages an angle member 127 which is fastened to the strap 28. The clip aids in holding the ledge 31 in place.

It is to be noted that the exterior molding 102 of FIGURE 7 has the same width as the exterior ledge 35 of FIGURE 8, and that its thickness is the same as the thickness of that portion of the ledge 35 shown at the extreme left of FIGURE 8. The result is that the end of the molding 102 can be butted against the end of the exterior ledge 35 in the region of the post 61 without interrupting the continuity of the exterior outlines of the two parts. Similarly, the interior molding 103 has the same exterior size and shape as the interior ledge 31 of FIGURE 8 so that these parts may also be joined end to end in the vicinity of the post 61 without causing a visible discontinuity.

It is contemplated that the interior and exterior moldings and ledges should be made in convenient lengths. For example, it is convenient to make the interior and exterior moldings each of a single semi-circular piece to define the newels although this is by no means necessary. In the region between newels the moldings may be of any convenient length, either the same or different than the length of the structural glass side panels. Similarly, the interior and exterior ledges can be manufactured in any convenient length.

As previously mentioned, it is desirable to make the interior molding and ledge of a strong, smooth, abrasion resistant material while it is often desirable to make the exterior molding and ledge of a different material. The selection of a different material is possible in a construction according to the present invention because the exterior molding and ledge sections are simply bolted or clamped to the remainder of the assembly. Thus, it is possible to make the exterior molding and ledge of either the same material as the interior or of an entirely different material, as the decorator chooses. One satisfactory arrangement is to select stainless steel for the interior and to make the exterior molding and ledge anodized aluminum, which is available in a variety of finishes.

Although a specific embodiment of the invention has been described in considerable detail for illustrative purposes, many modifications will occur to those skilled in the art. It is therefore desired that the protection afforded by Letters Patent shall be limited only by the true scope of the appended claims.

What is claimed is:

1. A passenger conveyor balustrade, comprising,
    a plurality of structural panels supported on edge in a substantially vertical plane adjacent to one side of said conveyor,
    a resilient, U-shaped nosing over the top edge of said panels,
    a two piece handrail molding structure supported by said panels,
    said structure including juxtaposed faces engaging said nosing on opposite sides of said panels,
    a handrail guiding structure including a track and an elongated channel shaped member supporting said track, and
    releasable means for holding said two pieces of said molding structure in engagement with each other and for holding each in engagement with said channel shaped member.

2. Apparatus according to claim 1 in which said panels are transparent.

3. Apparatus according to claim 2 in which said molding structure is formed to curve downwardly and under itself in an approximately semi-circular arc at each end of said conveyor.

4. Apparatus according to claim 3 in which each piece of said molding structure is made of a gradually increasing width starting at about the center of said arc and continuing along the downwardly and under extending portion of said structure.

5. Apparatus according to claim 4 in which said two pieces of said molding structure are made of different materials.

6. A passenger conveyor balustrade, comprising,
    a plurality of panels supported on edge in a substantially vertical plane adjacent to one side of said conveyor,
    a resilient nosing having a U-shaped cross section positioned over the top edge of said panels,
    an elongated plate formed with a downturned flange,
    said plate overlying the top edge of said panel and nosing with said flange engaging said nosing adjacent to the interior face of said panel,
    a first elongated member having a U-shaped cross section and fastened to said plate with the bottom of said U extending beyond the flangeless edge of said plate,
    a second elongated member of generally U-shaped cross section positioned with the outside of one leg engaging said nosing adjacent to the exterior face of said panel and with the end of said one leg engaging said plate and the end of the other leg engaging said first member, and
    means for releasably fastening said second member to said plate and said first member.

7. Apparatus according to claim 6 in which said panels are made of a structurally strong, transparent material.

8. Apparatus according to claim 7 in which said nosing, said plate and said first and second elongated members are formed, at each end of said conveyor, into a downward and under curving, approximately semi-circular arc.

9. Apparatus according to claim 8 in which said plate and said second member are each formed of increasing width beginning at approximately the center of said arc and continuing downward throughout the remainder of said arc.

10. Apparatus according to claim 9 in which said plate and said second member are made of different materials.

11. A passenger conveyor balustrade, comprising,
    a plurality of panels supported on edge in a substantially vertical plane adjacent to one edge of said conveyor,
    a plurality of upstanding substantially vertical posts, one between each two adjacent panels, each of said posts having a thickness approximately equal to the thickness of said panels, a resilient nosing having a U-shaped cross section positioned over the top edges of said panels and posts, an elongated plate formed with a downturned flange, said plate overlying the top edge of said panels, posts and nosing with said flange engaging said nosing adjacent to the interior face of said panel, a first elongated member having a U-shaped cross section and fastened to said plate with the bottom of said U extending beyond the flangeless edge of said plate, a second elongated member of generally U-shaped cross section positioned with the outside of one leg engaging said nosing adjacent to the exterior face of said panel and with the end of said one leg engaging said plate and the end of the other leg engaging said first member, means for releasably fastening said second member to said plate and said first member, and a plurality of braces, one interconnecting each of said posts to said second member.

12. Apparatus according to claim 11 in which said panels are made of a strong, transparent material.

13. Apparatus according to claim 12 in which said nosing, said plate and said first and second elongated members are formed, at each end of said conveyor, into a downward and under curving, approximately semi-circular arc.

14. Apparatus according to claim 13 in which said plate and said second member are each of increasing width beginning at approximately the center of said arc and continuing downward throughout the remainder of each arc.

15. Apparatus according to claim 14 in which said plate and said second member are made of different materials.

16. A balustrade for a passenger conveyor, comprising, a plurality of panels supported on edge in a substantially vertical plane adjacent to one side of said conveyor, interior and exterior ledges extending to either side of said panels adjacent to the bottom edges thereof, and a handrail support assembly supported on the top edge of said panels and including first and second elements constituting interior and exterior moldings, extending to either side of said panels, said moldings being releasably fastened together and including flange portions clasping the edge of said panels between them.

said support assembly extending along the top of said panels throughout the main run of said conveyor, said support assembly being formed, at each end of said conveyor, into downwardly curving approximately semi-circular arcs to define newel sections, said interior and exterior moldings each being flared outwardly from the plane of said panels, the flaring beginning approximately in the middle of said semicircular arcs and continuing along the bottom portion thereof, the flared ends of said interior and exterior moldings abutting the ends of said interior and exterior ledges respectively.

17. Apparatus according to claim 16 in which said panels are made of a structurally strong, transparent material.

18. Apparatus according to claim 17 in which said interior and exterior moldings are provided with different surface finishes.

19. Apparatus according to claim 17 in which said interior and exterior moldings are made of different materials.

20. A balustrade for a passenger conveyor, comprising, a plurality of panels supported on edge in a substantially vertical plane adjacent to one side of said conveyor, a plurality of posts, one between each pair of adjacent panels, the thickness of said posts being approximately equal to the thickness of said panels, interior and exterior ledges extending to opposite sides of said panels adjacent to the bottom edges thereof, a handrail support assembly supported on the top edges of said panels and posts and including first and second elements constituting interior and exterior moldings extending to opposite sides of said panels, said moldings being releasably fastened together and including flange portions clasping the edges of said panels between them, a plurality of braces, one interconnecting each of said posts to said moldings, said handrail support assembly extending along the top of said panels and posts throughout the main run of said conveyor, said support assembly being formed, at each end of said conveyor, into downwardly curving apporximately semi-circular arcs to define newel sections, said interior and exterior moldings each being flared outwardly from the plane of said panels, the flaring beginning approximately in the middle of said semicircular arcs and continuing along the bottom portion thereof, the flared ends of said interior and exterior moldings abutting the ends of said interior and exterior ledges respectively.

21. Apparatus according to claim 20 in which said panels are made of a structurally strong, transparent material.

22. Apparatus according to claim 21 in which said interior and exterior moldings are made of different materials.

References Cited by the Examiner
UNITED STATES PATENTS

| | | | |
|---|---|---|---|
| 1,199,326 | 9/1916 | Weil | 248—226.2 |
| 1,868,771 | 7/1932 | Shonnard | 198—16 |
| 2,686,585 | 8/1954 | Margles et al. | 198—16 |
| 2,979,180 | 4/1961 | Cole | 198—16 |
| 3,170,557 | 2/1965 | Takenaga et al. | 198—16 |

EVON C. BLUNK, *Primary Examiner.*

HUGO O. SCHULTZ, R. J. HICKEY,
*Assistant Examiners.*